(12) United States Patent
Fischer

(10) Patent No.: US 7,448,250 B2
(45) Date of Patent: Nov. 11, 2008

(54) CALIBRATION STANDARD

(75) Inventor: Helmut Fischer, Oberägeri (CH)

(73) Assignee: Immobiliengesellschaft Helmut Fischer GmbH & Co. KG, Sindelfingen (DE)

( * ) Notice: Subject to any disclaimer, the term of this patent is extended or adjusted under 35 U.S.C. 154(b) by 317 days.

(21) Appl. No.: 11/454,486

(22) Filed: Jun. 16, 2006

(65) Prior Publication Data

US 2006/0284089 A1  Dec. 21, 2006

(30) Foreign Application Priority Data

Jun. 20, 2005  (DE) .................. 10 2005 028 652

(51) Int. Cl.
*G01B 21/08* (2006.01)
*G01B 7/06* (2006.01)

(52) U.S. Cl. ....................... 73/1.81; 324/202

(58) Field of Classification Search ............. 73/1.81; 33/567–567.1; 324/202
See application file for complete search history.

(56) References Cited

U.S. PATENT DOCUMENTS

| 4,150,288 A | * | 4/1979 | Inoue et al. ............... 378/50 |
| 4,646,341 A | * | 2/1987 | Finer et al. ............... 378/207 |
| 4,995,198 A | * | 2/1991 | Zupanick ............... 451/38 |
| 2007/0119229 A1 | * | 5/2007 | Fischer ............... 73/1.81 |

FOREIGN PATENT DOCUMENTS

| DE | 272914 A | * | 10/1989 |
| SU | 1037067 A | * | 8/1983 |
| SU | 1229571 A | * | 5/1986 |

\* cited by examiner

*Primary Examiner*—Thomas P Noland
(74) *Attorney, Agent, or Firm*—Kriegsman & Kriegsman

(57) ABSTRACT

The invention relates to a calibration standard, especially for the calibration of devices for the non-destructive measurement of the thickness of thin layers, with a carrier layer (12) consisting of a basic material and a standard (17) applied on the carrier layer (12), said standard having the thickness of the layer to be measured at which the device is to be calibrated, with the carrier layer (12) comprising a plane-parallel measuring surface (16) to its bearing surface (14), that the standard (17) comprises a bearing surface (18) plane-parallel with its measuring surface (19) for bearing on the measuring surface (16) of the carrier layer (12), and that the standard (17) is permanently provided on the carrier layer (12) by means of plating by rubbing.

20 Claims, 4 Drawing Sheets

CALIBRATION STANDARD

BACKGROUND OF THE INVENTION

This invention relates to a calibration standard, especially for the calibration of devices for the non-destructive measurement of the thickness of thin layers with a carrier layer of a basic material and a standard applied on the carrier layer, said standard having the thickness of the layer to be measured at which the device is to be calibrated.

For the non-destructive measurement of the thickness of thin layers by a magnetic induction method or an eddy current method depending on the basic material, it is necessary that—after a standardization—the devices are calibrated to the corresponding measuring task. By means of the calibration, a difference between nominal and actual values is established. This difference will be corrected, with the device being calibrated to the measuring task.

For the correction of the difference between nominal and actual value, a measurement by means of the calibration standard is performed. To start with, a first value is registered on a carrier layer consisting of a basic material. Following that, another value is registered on a standard which is applied on the carrier layer. The difference will be the measured layer thickness. Due to the standard, the nominal value to be measured is determined. After several measurements, the averaged deviation between nominal and actual values will be registered and calibrated.

The calibration standards known so far consist of a carrier layer of the basic material on which the standard is applied or glued on as a plastic film such as, for example, polyethylene terephthalate (PTFP). The calibration standards are used for the reproduction of layer thicknesses from e.g. 40 μm to 1,000 μm. With these calibration standards, it is problematic—in particular in the lower range of the layer thickness—that the application or especially the gluing can already result in minor build-ups by the bonding agent, with the reproduced layer thickness being distorted. The use of such films has the additional disadvantage that they are ductile and have a rough surface.

SUMMARY OF THE INVENTION

Accordingly, this invention is based on the objective of providing a calibration standard which is simple to produce, having a high precision and repeating accuracy for the calibration of a device.

This problem is solved by a calibration standard in which the standard is permanently provided by means of plating by rubbing on the carrier layer. Due to plating by rubbing the standard on the carrier layer, it will be possible to provide—without bonding agents or other additives—a connection between the standard and the carrier layer by adhesion. After plating by rubbing and positioning of the standard on the carrier layer, a type of cold welding will result with an increasing duration of time. This connection ensures a secure and plane-parallel configuration of the standard on the carrier layer. At the same time, a high-precision design of the calibration standard is achieved since no additional materials are intended between the standard and the carrier layer which might result in buckling or warping of the surface of the standard versus the carrier layer.

According to an advantageous development of the invention, it is provided that the standard is positioned on the carrier layer by means of displacement movements with minor pressure. This can ensure that the layer of air between the bearing surface of the standard and a measuring surface of the carrier layer will be entirely displaced, and a direct adjacency of the bearing surface of the standard to the measuring surface of the carrier layer will be provided.

The basic material of the carrier layer is preferably made of steel, iron or nonferrous metal. The basic materials steel and iron are used for the magnetic induction measuring method. For the eddy current method, the basic material for the carrier layer will be selected from a nonferrous metal, brass, copper or from aluminum or an aluminum alloy.

The carrier layer preferably has a measuring surface which is polished or lapped. Thus, a surface with a low averaged surface roughness will be created so that uniform conditions are provided when the measuring probe is set onto the measuring surface. This surface is preferably hardened.

The standard is advantageously designed as an insulation layer. This insulation layer is preferably made of a semiconductor material. Here, element semiconductors—such as germanium or silicon—can be used, or compound semiconductors which consist, for example, of compounds of the elements of the main group III and V, such as GaAs, InSb, etc. or of the main group II and IV, such as CdS, ZnS, etc. These semiconductor materials are provided in wafers and brought to the desired form of the standard. The standard can be angular or round in form. This semiconductor material has the advantage that the wafers will be produced in exact layer thicknesses. This is achieved by individual atomic layers growing up in a defined manner, with defined layer thicknesses being achieved thereby. Semiconductor materials may be used which are doped, partially doped or which are defective in terms of the implementation of individual elements or dopings. Dopings of the semiconductor material have no effect on the measurement. The surface of such wafers is of a high strength; it has minor roughness and it is gleaming bright and thus provides identical setting conditions for a measuring probe over the entire measuring surface of the standard. Moreover, this material is nearly wear-proof; for example, with a total of 60,000 measurements at the same measuring point, a deviation of 0.8 μm was determined with a thickness of the standard of 200 μm.

According to another advantageous embodiment of the invention, it is provided that an auxiliary pole is allocated to the standard. This auxiliary pole is provided on a basic body at a pre-determined distance to the standard so that a device for measuring the thickness of thin layers—especially a manual measuring instrument—can be simply and safely calibrated with a base point or contact point or, respectively, an abutment.

Advantageously, it is provided that a carrier layer taking up several standards is positionable on a bearing surface on the basic body, with the bearing surface on the basic body being designed plane-parallel with the auxiliary pole. Thus, an exact alignment of the measuring surfaces of the carrier layer and the standards and the bearing surfaces on the basic body can be enabled.

According to a first embodiment of a calibration standard which comprises several standards and auxiliary poles allocated to them, it is provided that the contact surface of the auxiliary pole is taken up steplessly by an adjustment device, particularly by a thread in the basic body and is adjustable to the respectively allocated standard. Thus, it will be enabled that the contact surfaces of the auxiliary pole and those of the standard are in one plane. Thus, a tilt-free measurement can be performed. Preferably, adjacent to the auxiliary pole, a bearing surface is provided on the basic body which is in a plane with the measuring surface of the carrier layer of the associated standard so that first the measuring device is set onto a bearing surface—on the basic body—which is level with the measuring surface of the carrier layer to register a zero position and, subsequently, it is set onto the auxiliary pole and the associated standard, to measure the layer thickness and to perform the calibration of the measuring device.

According to another advantageous embodiment of the calibration standard, it is provided that—in the embodiment of at least one standard and one auxiliary pole allocated to it—the measuring surfaces of the standard are in one plane and one bearing surface of the basic body is in the same plane as the standard, and that graded auxiliary poles are provided on the basic body which are allocated to the graded measuring surfaces of the carrier layers. Thus, in this embodiment, the auxiliary poles are provided at different heights, as well as the measuring surface of the carrier layers, with the standards and the auxiliary poles being in a joint plane. An alternative embodiment provides for a reversal. In such a reversal, the carrier layer is provided in one plane with the bearing surface on the basic body. The auxiliary poles are provided graded in analogy with the measuring surfaces of the standard.

It is preferably provided that the standard is surrounded by a frame which preferably directly borders on the measuring surface of the standard. This embodiment has the advantage that the standard—in its planar extension—can be designed very small for setting on a sensor element of the measuring probe and that the following frame presents an enlargement of the contact surface for a probe bush of the measuring probe. The sensor element of the measuring probe is mostly kept movably in a probe bush. It will thus be rendered possible that the standard can be designed very small in its size and costs can thus be saved, with the supplementary frame having the same function as with a large-surface standard.

An advantageous embodiment of the standard with a frame surrounding the standard provides for the frame being formed of a nonferrous metal, of plastic, glass, ceramic. Such materials are more economical than the materials used for the standard. Moreover, any layer thicknesses, as well as geometries for taking up the standard can be provided in such materials.

BRIEF DESCRIPTION OF THE DRAWINGS

In the following, the invention as well as additional advantageous embodiments and developments of the same will be explained and described in detail on the basis of the examples presented in the drawings. The features which can be gathered from the description and the drawings can be used individually by themselves or in a plurality in any combination according to the invention. It is shown in.

DETAILED DESCRIPTION OF PREFERRED EMBODIMENTS

Figure 1:
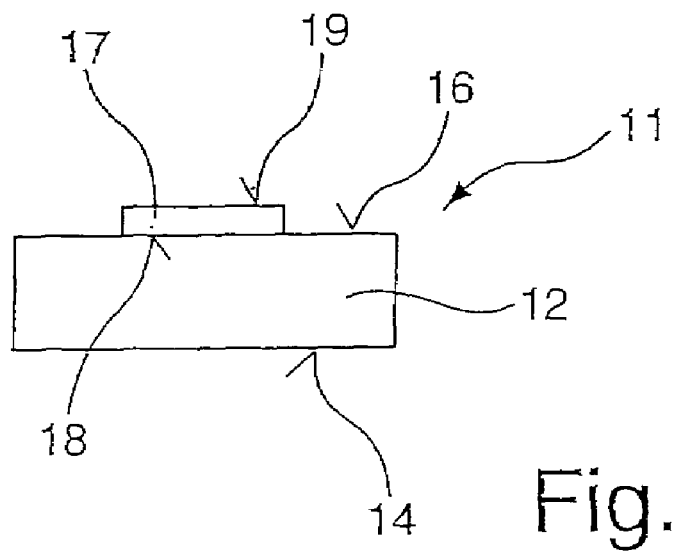
FIG. 1 a diagrammatic side view of the calibration standard.

FIG. 1 presents diagrammatically the calibration standard 11 according to the invention. It comprises a carrier layer 12 with a bearing surface 14 for positioning the calibration standard 11 on a measuring table or a work area. On the opposite side, a measuring surface 16 of the carrier layer 12 is provided which is produced plane-parallel with the bearing surface 14. This measuring surface 16 is preferably high-gloss polished. On this measuring surface 16, the standard 17 is provided. It rests with one bearing surface 18 on the measuring surface 16. On the opposite side, one measuring surface 19 of the standard 17 is provided, with the bearing surface 18 being aligned plane-parallel with the measuring surface 19.

The carrier layer 12 comprises a basic material, for example steel and iron for the magnetic induction layer thickness measuring method and a non-ferromagnetic basic material, e.g. non-magnetic steel, aluminum and their alloys for the layer thickness measurement by the eddy current method.

The standard 17 is produced as an insulating layer from a semiconductor material. For this, the standard 17 is produced from a wafer of semiconductor material, especially silicon or germanium.

For applying the standard 17 on the carrier layer 12, the measuring surface 16 is at least rubbed clean with a lint-free cloth and freed from dust. Additionally, the measuring surface 16 can be cleaned with alcohol or the like. In the same manner, the bearing surface 18 of the standard 17 will be cleaned. Additionally, the bearing surface 18 can be polished. Subsequently, the standard 17 is applied on the measuring surface 16 by pushing on or rubbing on. Preferably, the standard 17 is positioned at a desired position on the carrier layer 12 with light pressure and a sliding movement. By repeatedly moving the standard 17 back and forth about the desired point, the standard 17 can be positioned to the carrier layer 12. After positioning the standard 17 on the carrier layer 12, the standard 17 remains permanently on the carrier layer 12 due to adhesion forces and a beginning cold welding setting in.

On the carrier layer 12, the nominal value of the layer thickness for the standard 17 is still additionally indicated, as well as the basic material of the carrier layers 12 or a layer/carrier combination.

The standard 17 can be provided and applied in layer thicknesses of up to 1,000 μm. Even layer thicknesses of e.g. 10 μm of the standard 17 can be provided by pushing on the carrier layer 12 for producing the calibration standard 11 according to the invention. The measurement of the thickness of the standard 17 can be traceably performed with mechanical precision methods which in turn are calibrated.

Figure 3A:
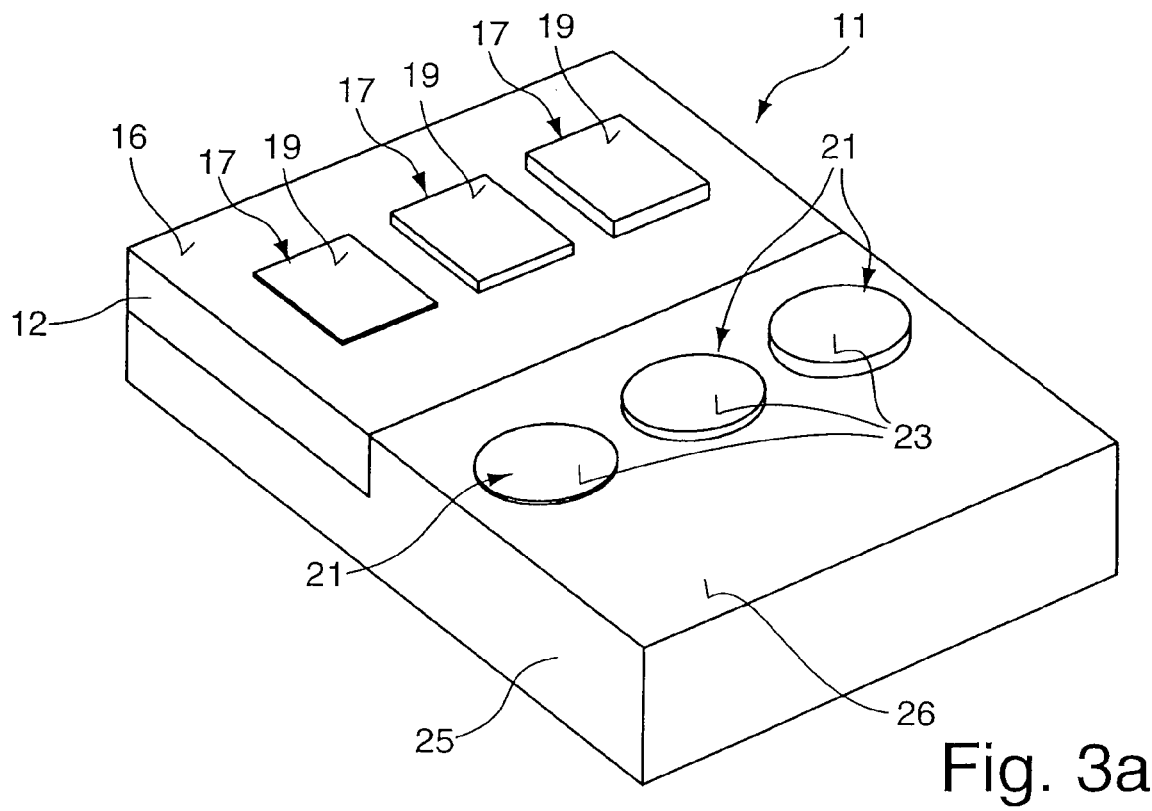
FIG. 3a a perspective presentation of a calibration standard with an auxiliary pole allocated to it, FIG. 3b a perspective presentation of an alternative embodiment of a calibration standard of FIG. 3a, FIG. 4 a perspective presentation of an alternative embodiment of FIG. 3, and FIG. 5 a perspective presentation of another alternative embodiment of FIGS. 3 and 4.

FIG. 3a presents a calibration standard 11 which is provided in particular for devices which have—in addition to the measuring probe—a contact point or abutment by means of which the measuring device is first set onto a measuring surface before the measuring probe is set onto the layer thickness to be measured. To calibrate in particular such measuring devices which are designed, for example, as manual instruments, a calibration standard 11 is proposed which comprises at least one standard 17 and at least one auxiliary pole 21 allocated to the standard 17. In the exemplary embodiment according to FIG. 3, three standards 17 are exemplarily combined to one calibration standard 11. These standards 17 stand for different layer thicknesses such as, for example, 50 μm, 100 μm and 500 μm. The auxiliary pole 21 is provided on a basic body 25. This basic body 25 comprises a bearing surface 26 which comprises a surface quality in analogy to the measuring surface 16 of the carrier layer 12. The basic body 25 takes up the carrier layer 12, with a plane-parallel bearing surface being created for the bearing surface 26 on which the carrier layer 12 rests.

In this exemplary embodiment, the measuring surface 16 lies in a plane with the bearing surface 26. Thus, the measuring device can first be set on with a contact point on the measuring surface 26 to subsequently set the measuring probe onto the measuring surface 16. For calibration of the measuring device, a contact point of the measuring device is subsequently set onto a bearing surface 23 of the auxiliary pole 21, and the measuring probe is set on the measuring surface 19 of the allocated standard 17. The bearing surface 23 of the auxiliary pole 21 lies plane-parallel with the allocated standard 17 in the same plane.

By means of such a calibration standard 11, a tilt-free measurement can be carried out with such manual instruments and an exact calibration can be performed. The number of the standards 17 and their allocated auxiliary poles 21 provided on the calibration standard 11 are only exemplary. In this embodiment, the auxiliary poles 21 are provided by a thread in the basic body 25 and can be adjusted to the thickness of the standard 17.

Figure 3B:
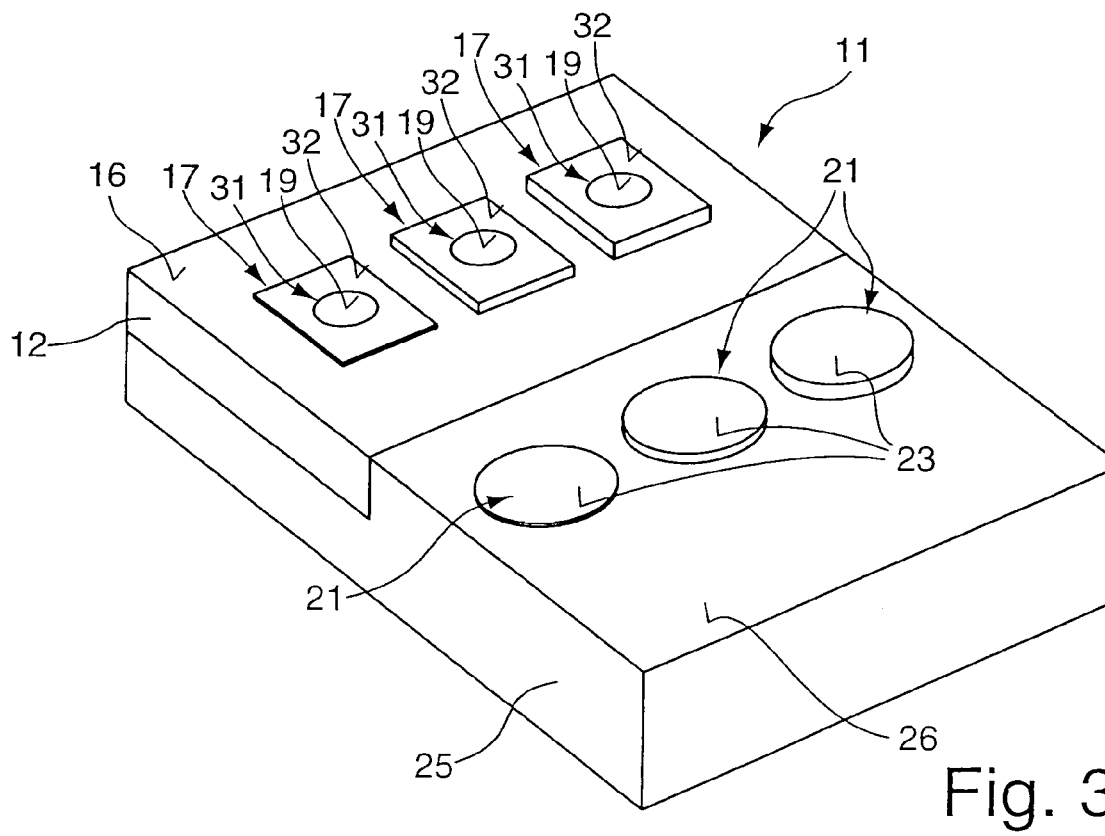

FIG. 3b presents an alternative embodiment of a calibration standard 11 to FIG. 3a. In this embodiment, the standards 17 are reduced in size. To achieve a sufficiently large bearing surface for a probe bush of the measuring probe, the standard is surrounded by a frame 31. This frame 31 advantageously borders directly on the standard 17. One bearing surface 32 of the frame 31 turns preferably flush into the bearing surface 19 of the standard 17. However, it is not absolutely required that this bearing surface 32 lies in a plane with the bearing surface 19 since the sensor element is slidably provided versus the probe bush and can plunge into the probe bush. This frame 31 is preferably made of a more economical material than the standard 17. For example, a nonferrous metal, glass, ceramic or especially plastic material can be provided. The form of the frame 31 may be round or angular. A recess in the frame 31 for taking up the standard 17 is adjusted to the geometry of the standard 17.

Figure 2:
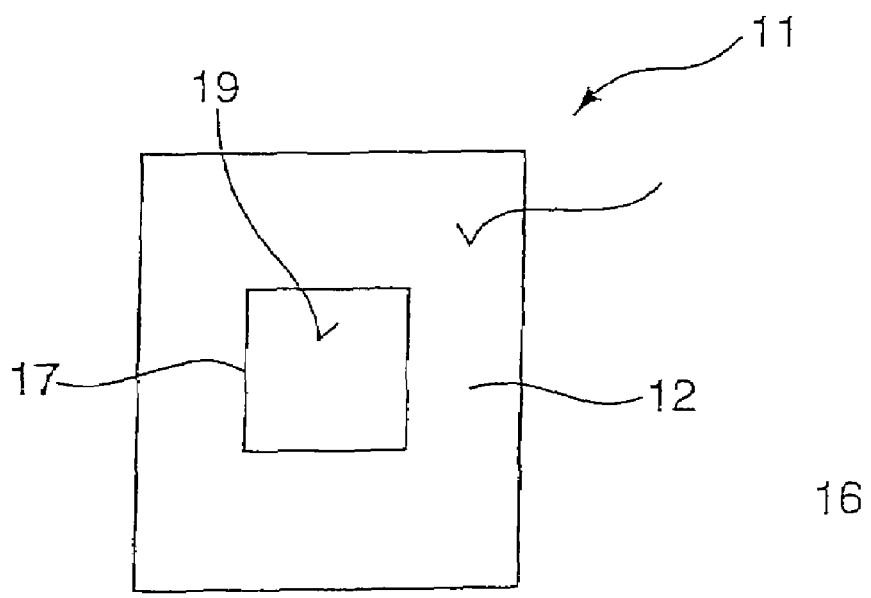
FIG. 2 a diagrammatic top view of the calibration standard.
Figure 4:
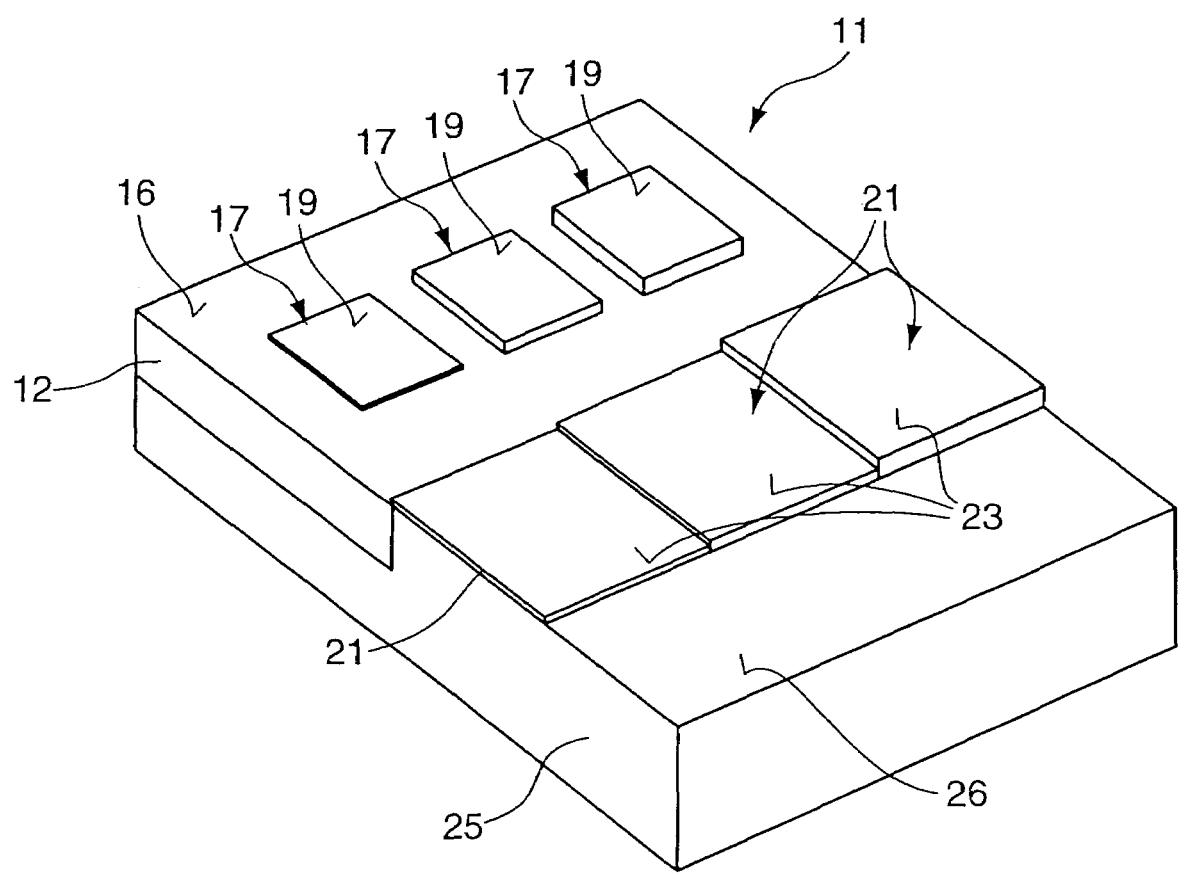
Figure 5:
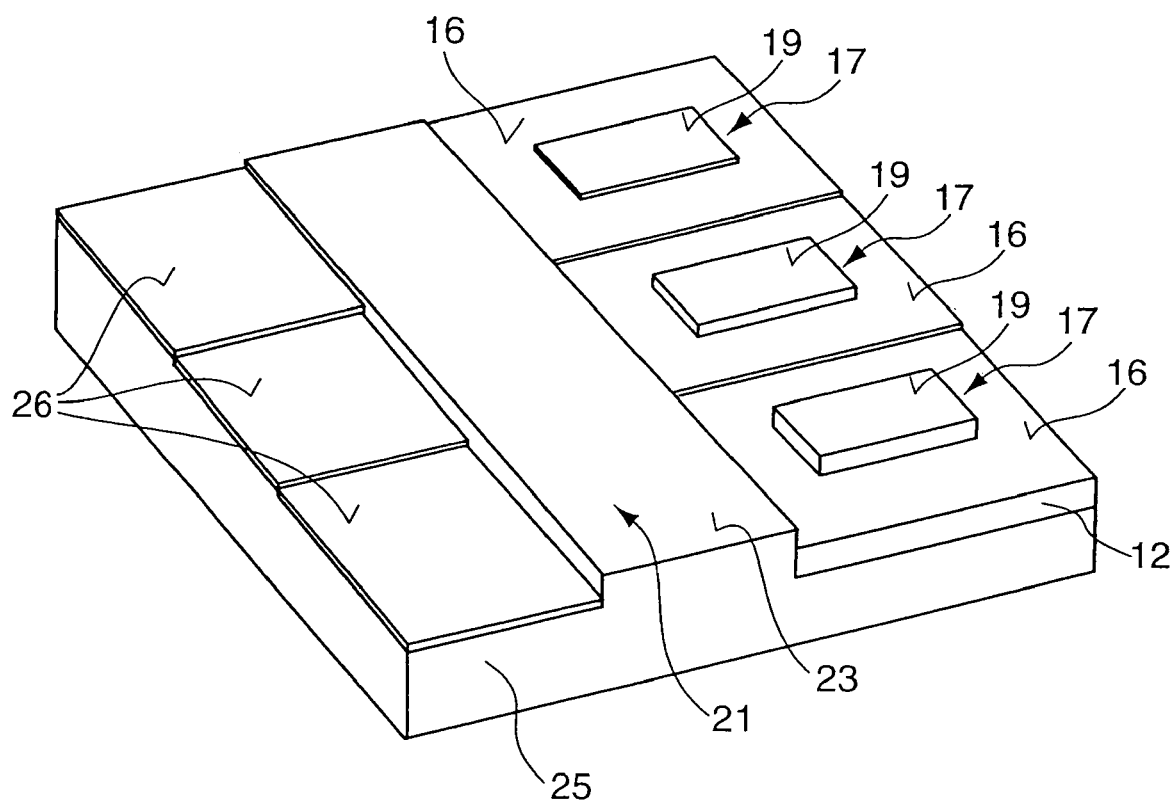

The allocation of a frame 31 to a standard 17 can be provided with a calibration standard 11 according to the embodiments in the FIGS. 3a, 4 and 5, as well as with an embodiment according to the FIGS. 1 and 2. Such a frame 31 can additionally feature a protective function to protect a transfer between the adjoining bearing surfaces 16 and 18 from the carrier layer 12 and the standard 17.

FIG. 4 presents an alternative embodiment of FIG. 3. Instead of the adjustable auxiliary poles 21, contact surfaces 23 are provided which are worked into the basic body 25 by milling. The bearing surface 26 of the basic body 25 is, in turn, provided plane-parallel with the measuring surface 16 of the carrier layer 12 and lying in the same plane.

FIG. 5 presents an alternative embodiment of FIG. 3 and 4 and in particular a reversal of the embodiment of FIG. 4. The measuring surfaces 19 of the standard 17 are in a joint plane. In this plane, the auxiliary pole 21 is also provided with a contact surface 23 on the basic body 25 for taking up the contact point of the measuring device. The measuring surface 16 of the pertinent carrier layer 12 is displaced versus the contact surface 23 by the thickness of the standard 17. The same applies analogously for the bearing surface 26.

These calibration standards 11 according to the invention are highly precise for layer thickness measurements.

All of the above mentioned features are essential for the invention and can be randomly combined with each other.

What is claimed is:

1. Calibration standard, for the calibration of devices for the non-destructive measurement of the thickness of thin layers with a carrier layer consisting of a basic material and a standard applied on the carrier layer, said standard having the thickness of the layer to be measured at which the device is to be calibrated, characterized in that the carrier layer comprises a plane-parallel measuring surface to its bearing surface, that the standard comprises a bearing surface plane-parallel with its measuring surface for bearing on the measuring surface of the carrier layer, and that the standard is permanently provided on the carrier layer by means of plating by rubbing.

2. Calibration standard according to claim 1, characterized in that the standard is positioned on the carrier layer by means of displacement movements with minor pressure.

3. Calibration standard according to claim 1, characterized in that the basic material of the carrier layer consists of steel, iron or nonferrous metals.

4. Calibration standard according to claim 1, characterized in that at least the measuring surface of the carrier layer comprises a polished or lapped surface.

5. Calibration standard according to claim 1, characterized in that the standard is formed of an insulating layer.

6. Calibration standard according to claim 1, characterized in that the standard is produced from a semiconductor material.

7. Calibration standard according to claim 6, characterized in that the standard is produced from a germanium or silicon wafer.

8. Calibration standard according to claim 6, characterized in that a measuring surface of the standard is polished or lapped.

9. Calibration standard according to claim 6, characterized in that a bearing surface of the standard is polished or lapped.

10. Calibration standard according to claims 6, characterized in that the standard comprises a layer thickness from 10 µm to 1,000 µm.

11. Calibration standard according to claim 1, characterized in that an auxiliary pole is provided, spaced from the standard and allocated to it, said pole comprising a plane-parallel contact surface to the measuring surface of the standard.

12. Calibration standard according to claim 11, characterized in that the contact surface of the auxiliary pole is provided on a basic body.

13. Calibration standard according to claim 12, characterized in that the basic body takes up the carrier layer on a bearing surface in parallel with the contact surface.

14. Calibration standard according to claim 11, characterized in that the contact surface of the auxiliary pole is provided steplessly by an adjustment device, comprising thread, in the basic body and adjustable to the plane of the measuring surface of the allocated standard.

15. Calibration standard according to claim 11, characterized in that, on the basic body, a bearing surface is provided for a contact point of a measuring device which lies in the plane of the carrier layer.

16. Calibration standard according to claim 11, characterized in that the measuring surfaces of at least two standards are lying in one plane and a bearing surface of the basic body lies in the same plane, and that graded bearing surfaces are provided on the basic body which are allocated to graded measuring surfaces of the carrier layer.

17. Calibration standard according to claim 11, characterized in that the measuring surfaces of the carrier layer are lying in one plane with one bearing surface of the basic body and that the contact surfaces of the auxiliary poles are provided as graded surfaces whose plane lies in the corresponding measuring surface of the standard.

18. Calibration standard according to claim 1, characterized in that the standard is surrounded by a frame.

19. Calibration standard according to claim 18, characterized in that the frame directly borders on the measuring surface of the standard.

20. Calibration standard according to claim 18, characterized in that the frame is made of a nonferrous metal, of plastic, glass or ceramic.

* * * * *